United States Patent
Grylls et al.

(10) Patent No.: US 6,544,003 B1
(45) Date of Patent: Apr. 8, 2003

(54) GAS TURBINE BLISK WITH CERAMIC FOAM BLADES AND ITS PREPARATION

(75) Inventors: Richard John Grylls, Loveland, OH (US); Curtiss Mitchell Austin, Loveland, OH (US); James Jay Kightlinger, Morrow, OH (US)

(73) Assignee: General Electric Co., Cincinnati, OH (US)

( * ) Notice: Subject to any disclaimer, the term of this patent is extended or adjusted under 35 U.S.C. 154(b) by 0 days.

(21) Appl. No.: 09/708,747

(22) Filed: Nov. 8, 2000

(51) Int. Cl.[7] ................................................ F01D 5/14
(52) U.S. Cl. ................................... 416/234; 416/241 B
(58) Field of Search .......................... 416/234, 241 B, 416/241 R, 229 A, 230; 415/200

(56) References Cited

U.S. PATENT DOCUMENTS

| | | | |
|---|---|---|---|
| 3,090,094 A | * 5/1963 | Schwartzwalder et al. | 264/628 |
| 4,067,662 A | * 1/1978 | Rossman | 416/97 A |
| 4,285,634 A | * 8/1981 | Rossman et al. | 416/97 A |
| 4,375,233 A | 3/1983 | Rossmann et al. | |
| 4,673,435 A | 6/1987 | Yamaguchi et al. | 75/235 |
| 4,697,632 A | * 10/1987 | Lirones | 164/369 |
| 5,011,063 A | 4/1991 | Claar | |
| 5,061,660 A | 10/1991 | Park et al. | |
| 5,214,011 A | 5/1993 | Breslin | 501/127 |
| 5,236,151 A | * 8/1993 | Hagle et al. | 244/117 A |
| 5,273,708 A | * 12/1993 | Freeman | 419/35 |
| 5,308,422 A | 5/1994 | Askay et al. | |
| 5,403,153 A | * 4/1995 | Goetze | 416/229 A |
| 5,503,213 A | 4/1996 | Pyzik et al. | |
| 5,518,061 A | 5/1996 | Newkirk et al. | 164/97 |
| 5,556,257 A | * 9/1996 | Foster et al. | 416/241 R |
| 5,728,638 A | 3/1998 | Strange et al. | 501/127 |
| 6,250,883 B1 | * 6/2001 | Robinson et al. | 416/241 B X |
| 6,378,755 B1 | * 4/2002 | Grylls et al. | 228/122.1 |
| 6,428,280 B1 | * 8/2002 | Austin et al. | 416/241 B |
| 6,435,824 B1 | * 8/2002 | Schell et al. | 416/241 B X |

OTHER PUBLICATIONS

J. Ringnald et al., "Scanning and Transmission Electron Microscopy on Composite Materials prepared by SMP and In–Situ Displacive Reactions," *Inst.Phys.Conf.Ser.* No. 147, Section 13, pp. 571 et seq. (1995).
Nine page printout from Internet page of BFD, Inc, www.bfd–inc.com, printed Apr. 24, 2000.

\* cited by examiner

*Primary Examiner*—Edward K. Look
*Assistant Examiner*—Richard A. Edgar

(57) ABSTRACT

A blisk combining gas turbine blades and disk in a single structure comprises a disk and a number of blades integrally affixed to the disk. Each blade includes an airfoil made at least in part of an open-cell solid ceramic foam formed of ceramic cell walls, and an intracellular volume therebetween. The ceramic cell walls are preferably alumina, and the intracellular volume is preferably filled at least in part with a nickel-base superalloy. Another portion of the intracellular volume may be empty porosity.

20 Claims, 4 Drawing Sheets

GAS TURBINE BLISK WITH CERAMIC FOAM BLADES AND ITS PREPARATION

FIELD OF THE INVENTION

This invention relates to a gas turbine blisk, and, more particularly, to a gas turbine blisk in which ceramic foam blades are integrally affixed to a disk.

BACKGROUND OF THE INVENTION

In an aircraft gas turbine (jet) engine, air is drawn into the front of the engine, compressed by a shaft-mounted compressor, and mixed with fuel. The mixture is burned, and the hot exhaust gases are passed through a turbine mounted on the same shaft. The flow of combustion gas turns the turbine by impingement against an airfoil section of the turbine blades and vanes, which turns the shaft and provides power to the compressor. In a more complex version of the gas turbine engine, the compressor and a high pressure turbine are mounted on one shaft, and a bypass fan and a low pressure turbine are mounted on a separate shaft. In any event, the hot exhaust gases flow from the back of the engine, driving it and the aircraft forwardly.

There are two approaches to the assembly of the blades and disk of an axial-flow compressor or axial-flow turbine. In one approach, the blades are mechanically affixed to the disk, using a dovetail attachment or other structure. In the other approach, the blades are integral with the disk. The second approach having an integral blade/disk structure, called a "blisk" in the art, is favored in those situations where it may be used because the mechanical attachment of the first approach may add a substantial amount of weight to the structure. Both approaches have been used in the compressor stage. For example, high-pressure titanium-alloy blisks are used in the high-pressure compressor stages of some engines.

Blisks are not conventionally used in the high-pressure or low-pressure turbine stages. The materials used in the disk and the blades must be quite different in characteristics to achieve optimal performance. There has been no approach available to join blades to disks that has been found operable in the extreme loading and environmental conditions experienced in the turbine stages. Reinforcement of the turbine blades with ceramic fibers has not been generally successful because of thermal mismatch differences between the base metal and the ceramic.

There is therefore a need for an improved approach to the fabrication of a gas turbine blisk. The present invention fulfills this need, and further provides related advantages.

BRIEF SUMMARY OF THE INVENTION

The present invention provides an integral gas turbine blade/disk ("blisk") and a method for its fabrication. The blades are integrally joined to the disk. The blades are made of a material which has reduced weight as compared with conventional turbine blades and may be tailored for even further weight reduction. The blade material has excellent high-temperature mechanical properties and also is impact resistant. Uncooled blades may be used in some stages of the turbine where it was previously necessary that the blades be cooled. The use of protective coatings may be unnecessary in some stages of the turbine where they were previously necessary, reducing weight and cost. The blisk of the invention is suitable for use in high-pressure and low-pressure turbine stages, as well as the compressor stages. The introduction of blisk technology into the turbine stages significantly improves gas turbine performance by reducing the weight of the turbine disk and blades. The reduction in weight in the turbine disk and blades also results in reduced bearing weight and structural support weight.

A blisk comprises a disk and at least one blade integrally affixed to the disk. Each blade includes an airfoil comprising an open-cell solid ceramic foam comprising ceramic cell walls, and an intracellular volume therebetween. All or a part of each blade may be the open-cell solid ceramic foam, with the remainder metal.

The disk preferably comprises a disk nickel-base superalloy. The blades comprise the ceramic cell walls, preferably of alumina, and the intracellular volume, which may be partially a blade metal such as a blade nickel-base superalloy and partially empty porosity to reduce weight. The ceramic foam is preferably at least about 60 percent by volume of the ceramic cell walls, with the balance the intracellular volume.

The disk is preferably formed by conventional disk-fabrication technology. The blades are preferably formed by providing a piece of a sacrificial ceramic having the shape of the blade, and contacting the piece of the sacrificial ceramic to a reactive metal which reacts with the sacrificial ceramic to form an oxidized ceramic compound of the reactive metal and a reduced form of the ceramic. The resulting structure comprises the ceramic foam of the oxidized ceramic compound of the reactive metal with ceramic cell walls and the intracellular volume between the ceramic cell walls having a metallic reaction product therein. In subsequent processing, a portion of the metallic reaction product may be removed and/or replaced with another metal that is more suitable for the turbine blade application. The blades are conveniently joined to the disk by interdiffusion of the disk metal and the blade metal, but other techniques such as welding may be used as well.

The resulting structure has blades of the ceramic foam joined to the disk, which is preferably made of the disk nickel-base superalloy. The blades may have the entire intracellular volume filled with an appropriate metal such as the blade nickel-base superalloy. The blade nickel-base superalloy is integrally joined to the disk nickel-base superalloy by interdiffusion, saving the weight of a mechanical joint. The intracellular volume toward the tip of the turbine blade may be removed to leave porosity. The porosity reduces the weight of the turbine blade, and the resulting porous structure is resistant to erosion and impact damage. Because this portion of the turbine blade has no metal, it need not be protected by a protective coating structure such as a thermal barrier coating.

The present approach thus provides an integral blisk structure suitable for the high-pressure and low-pressure stages of a gas turbine engine. This structure achieves improved performance with reduced weight. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
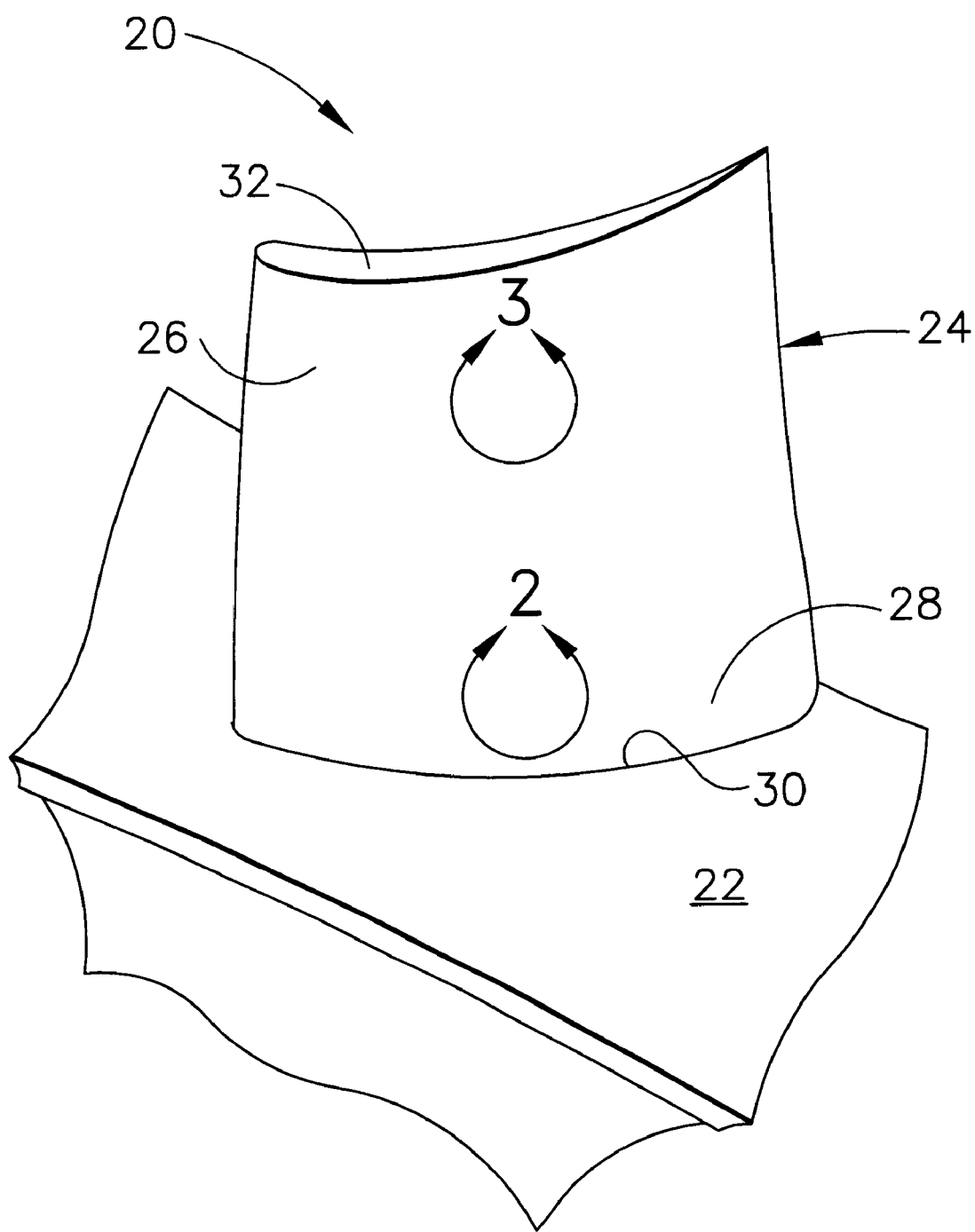
FIG. 1 is a fragmentary elevational view of a gas turbine blisk.

FIG. 1 depicts a blisk 20, which is a term of art for an integral blade and disk. The blisk 20 includes a disk 22 and a blade 24 integrally attached thereto. That is, the attachment of the disk 22 and the blade 24 is metallurgical and semi-permanent or permanent in nature. The disk 22 is a flat disk that is mounted to rotate on a shaft (not shown) extending through its center. The disk 22 is preferably made of a nickel-base superalloy. Typically there is a plurality of the blades 24, each extending outwardly from the center of the disk 22 along respective radii of the disk 22, but only one is shown in the fragmented view of FIG. 1.

The blade 24 comprises an airfoil 26 that is curved to function in the stream of gas that flows past the blade 24. The airfoil 26 has a root end 28 at a base of the blade 24 with an interface 30 at which the blade 24 is joined to the disk 22. The airfoil also has a tip end 32 remote from the root end 28. The blisk 20 may be a turbine blisk used in one of the hot stages of a gas turbine engine, or it may be a compressor blisk used in one of the front-end compressor stages. The details of the shapes and dimensions of the disk 22 and the blade 24 are known in the art and are not within the scope of the present invention.

Figure 2:
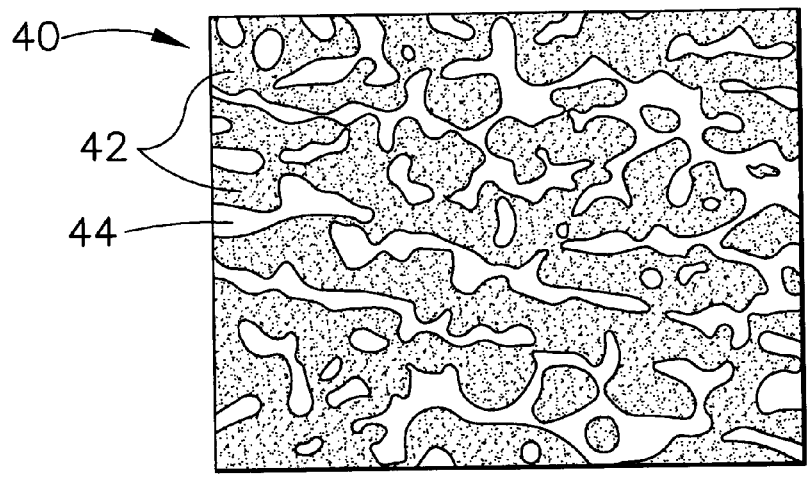
FIG. 2 is a schematic enlarged detail of the blade of FIG. 1, showing the microstructure near the root in region 2—2.

FIG. 2 is a schematic detail of FIG. 1, schematically illustrating the microstructure of the material that forms the root end 28 of the airfoil 26 of the blade 24. The root end 28 of the airfoil 26 is formed of an open-cell solid ceramic foam 40 comprising ceramic cell walls 42, and an intracellular volume 44 therebetween. The cell walls 42 and the intracellular volume 44 are each interpenetrating, continuous regions. The ceramic cell walls 42 are any operable ceramic, but are preferably an alumina-based material. Alumina is synonymous herein with aluminum oxide and $Al_2O_3$. The intracellular volume 44 is preferably a metal such as a nickel-base superalloy. The ceramic cell walls 42 preferably comprise at least about 60 percent by volume, and most preferably from about 60 to about 80 percent by volume, of the ceramic foam 40. The intracellular volume 44 preferably occupies the remainder of the volume of the ceramic foam material 40.

Although it cannot be readily discerned from FIG. 2, the ceramic cell walls 42 are internally continuous, and the intracellular volume 44 is internally continuous. All portions of either phase 42 and 44 are respectively continuous, so that there is a continuous path from the external surfaces to any location within either phase.

As used herein, a disclosure of a metal within the intracellular volume 44 includes both the pure form of the metal and its alloys. For example, "nickel" includes pure nickel and nickel-base alloys. As used herein, "metal-base" means that the composition has more of the named metal present than any other element. For example, a nickel-base alloy has more nickel than any other element. The nickel-base alloy may additionally be a nickel-base superalloy, meaning that it is of a composition which is strengthened by the precipitation of gamma-prime phase. A typical nickel-base alloy has a composition, in weight percent, lying in the ranges of from about 1 to about 25 percent cobalt, from about 1 to about 25 percent chromium, from about 0 to about 8 percent aluminum, from 0 to about 10 percent molybdenum, from about 0 to about 12 percent tungsten, from about 0 to about 12 percent tantalum, from 0 to about 5 percent titanium, from 0 to about 7 percent rhenium, from 0 to about 6 percent ruthenium, from 0 to about 4 percent niobium, from 0 to about 0.2 percent carbon, from 0 to about 0.15 percent boron, from 0 to about 0.05 percent yttrium, from 0 to about 1.6 percent hafnium, balance nickel and incidental impurities.

Figure 3:
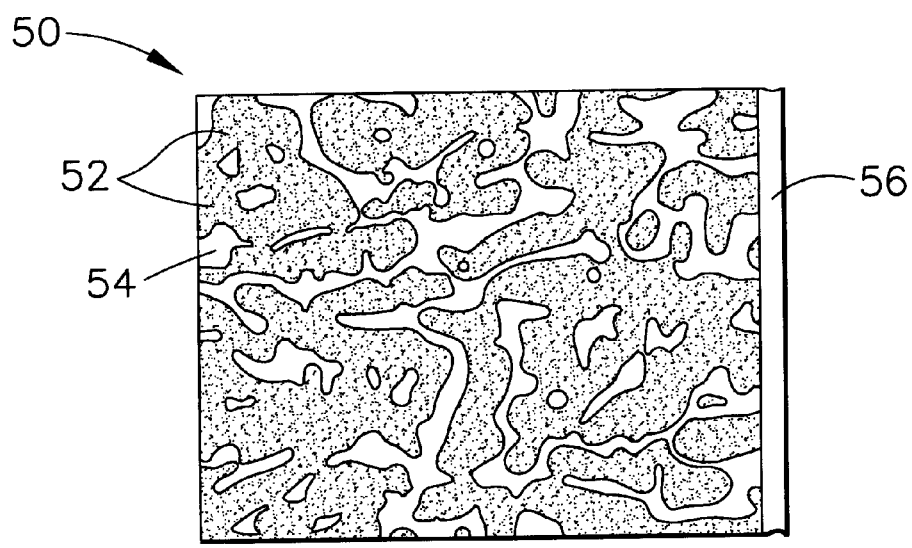
FIG. 3 is a schematic enlarged detail of the blade of FIG. 1, showing the microstructure near the root in region 3—3.

FIG. 3 is another schematic detail of FIG. 1, schematically illustrating the microstructure of the material that forms the tip end 32 of the airfoil 26 of the blade 24. The tip end 32 of the airfoil 26 is formed of an open-cell solid ceramic foam 50 comprising ceramic cell walls 52, and an intracellular volume 54 therebetween. The cell walls 52 and the intracellular volume 54 are each interpenetrating, continuous regions. The ceramic cell walls 52 are any operable ceramic, but are preferably an alumina-based material. The ceramic cell walls 52 preferably comprise at least about 60 percent by volume, and most preferably from about 60 to about 80 percent by volume, of the ceramic foam 50. The intracellular volume 54 preferably occupies the remainder of the volume of the ceramic foam material 50. Although it cannot be readily discerned from FIG. 3, the ceramic cell walls 52 are internally continuous, and the intracellular volume 54 is internally continuous. All portions of either phase 52 and 54 are respectively continuous, so that there is a continuous path from the external surfaces to any location within either phase. The ceramic foam 50 is identical with the ceramic foam 40 in respect to the characteristics discussed in this paragraph.

However, the ceramic foam 50 differs from the ceramic foam 40 in that the intracellular volume 54 may be either a metal such as a nickel-base superalloy or empty porosity. If the intracellular volume 54 is a metal, it is preferably the same metal as that found in the intracellular volume 44. In that case, the ceramic foam 50 is identical to the ceramic foam 40.

It is preferred that the intracellular volume 54 be empty porosity. The continuous ceramic cell walls 52 serve as a structural skeleton that provides the structural support and strength for the tip end 32 of the airfoil 26, and provides the necessary external shape for the blade 24. The presence of empty porosity in the intracellular volume 54 has several advantages. That the ceramic cell walls 42 and 52 are alumina or other light-weight ceramic reduces the weight of the blade 24 substantially. A reduction in the weight of the blade 24 reduces the required weight of the disk 22 and its supporting structure, resulting in a significant reduction in weight of the engine. The presence of empty porosity in the intracellular volume 54 further reduces the weight of the blade 24. The empty porosity also reduces the likelihood of damage arising from differential thermal expansion strains and stresses in the tip end 32 as the blade 24 is heated and cooled in service. The empty porosity also allows the skeleton of the ceramic cell walls 52 to crush responsive to impacts during service, rather than to form cracks that propagate throughout the structure. If desired, the empty porosity at the surface of the ceramic foam 50 may be sealed with a thin film of a ceramic paste and then fired prior to service. The result is a thin layer of a sealing ceramic 56 at the surface, as shown at one of the surfaces in FIG. 3. Most preferably, the interior of the ceramic body is left in a porous state.

Figure 4:
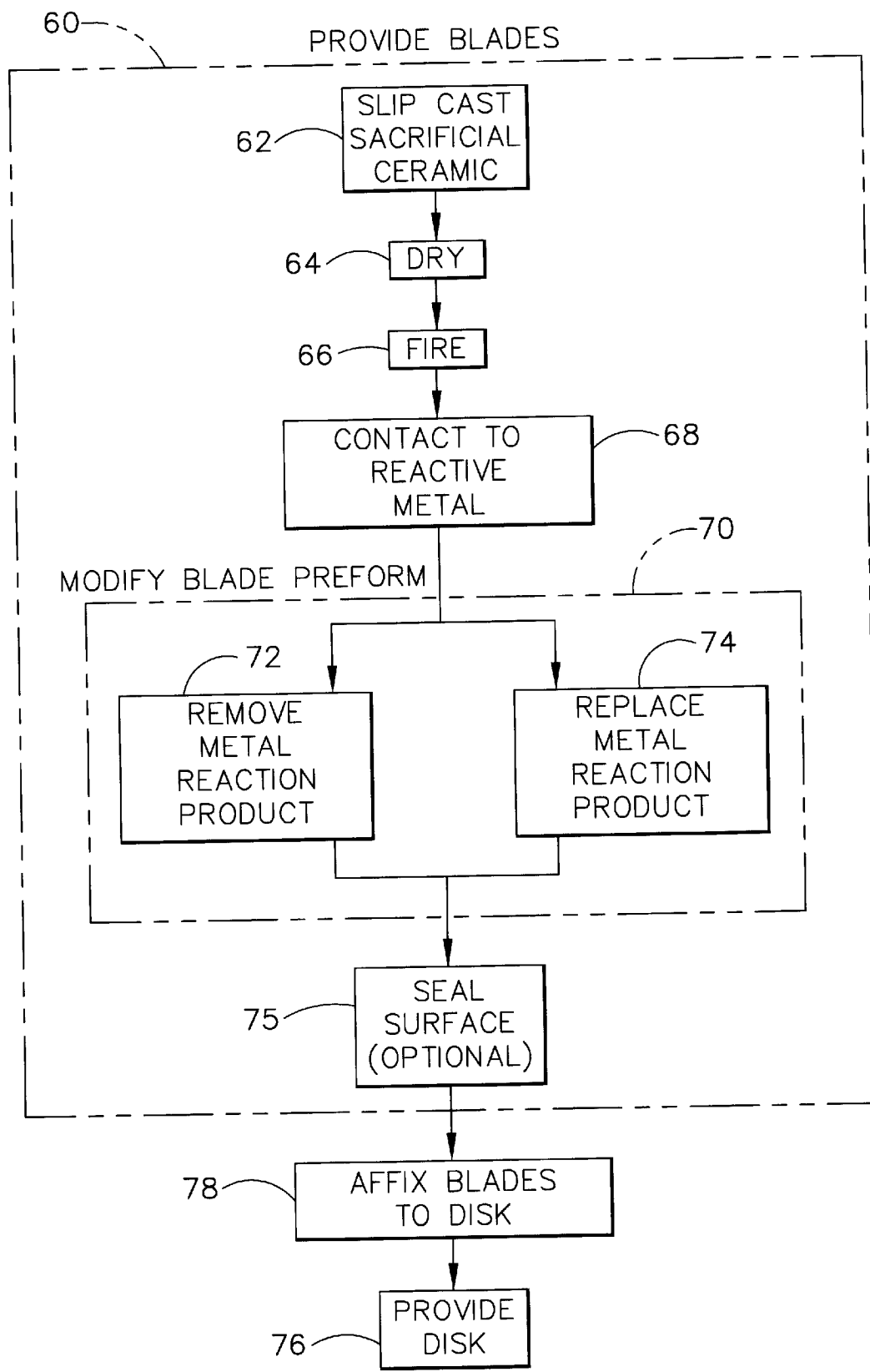
FIG. 4 is a block flow diagram of an approach for fabricating the blisk.

FIG. 4 illustrates a preferred method for forming the blisk 20. The blade 24 is provided, numeral 60. The blade 24 has a shape and size as required for the intended application. The blade 24 is preferably prepared by first fabricating a sacrificial ceramic form. The sacrificial ceramic form is prepared by an operable approach, and a preferred approach is illustrated in FIG. 4. In this preferred approach, a slip of a sacrificial ceramic material is prepared and cast into a mold that has the same shape, but slightly larger dimensions, than the required dimensions of the blade 24, numeral 62. The preferred sacrificial ceramic material is silica (silicon dioxide, $SiO_2$). Additions of modifiers may be made to the ceramic slip. For example, additions that modify the firing behavior of the ceramic, such as calcia (calcium oxide) in the case of silica, may be made. Additions that modify the porosity of the final reacted ceramic material, such as mullite, may be made. Additions that modify the properties of the final reacted ceramic material, such as boron nitride to increase the wear resistance of the final reacted ceramic material, may be made.

The slip casting of silica particles is well known in other applications, and the same procedures are used here. Typically, a slurry of silica particles and acrylic binder in water carrier is prepared and poured into the mold. The mold and its contents are dried, numeral 64, to remove the carrier liquid. The dried slip cast material is thereafter heated to an elevated temperature to fire and fuse the ceramic, numeral 66. In the case of silica, a typical firing temperature is about 2000° F. and a firing time is about 4 hours. The original slip casting is made slightly oversize to account for the slight shrinkage during drying and firing. The required oversize is known in the art because slip casting is so widely employed for other applications, but is typically about 1–15 percent.

Other operable techniques to furnish the central core precursor, step 60, may be used as well. The central core precursor may be transfer molded or injection molded (collectively termed "molded"), for example. In these techniques, the sacrificial ceramic powder may be mixed with a plasticizer and/or other process aids and forced into a cavity that defines the desired shape.

The sacrificial ceramic form is thereafter contacted to a molten reactive metal, numeral 68, most preferably an aluminum-base metal. The sacrificial ceramic form may be contacted to the molten reactive metal by any operable approach. In one approach, the contacting is accomplished by immersion of the sacrificial form into the molten reactive metal. In another approach, the contacting is accomplished by floating or otherwise contacting the sacrificial form only to the surface of the reactive metal, so that the reaction occurs only on a portion of the surface of the sacrificial ceramic form. The preferred approach is disclosed in U.S. Pat. Nos. 5,214,011 and 5,728,638, whose disclosures are incorporated by reference. The metal may be a pure metal, or it may be an alloy containing the reactive metal. Most preferably, the reactive metal, when in alloy form, contains more of the reactive element than any other element. The reactive metal may optionally be mixed with nonreactive metals such as a large fraction of nickel and other elements of the nickel-base alloy of interest for some applications, as disclosed in the '638 patent.

While the sacrificial ceramic form is contacted to the reactive metal, the ceramic of the sacrificial ceramic form is chemically reduced and the reactive metal is chemically oxidized. (Reduction and oxidation are broadly interpreted in the sense of electron transfer.) The reactive metal becomes an oxide or oxidized form, aluminum oxide in the preferred case. As a result of a mechanism involving volume changes and internal fracturing and discussed in the '011 patent, the foam or sponge structure is formed throughout the sacrificial ceramic as it transforms from the sacrificial form-composition to the final composition. The intracellular volume that results is filled with the metal resulting from the reaction process. The result of the contacting step 68 is a reacted ceramic foam blade preform.

Figure 5:
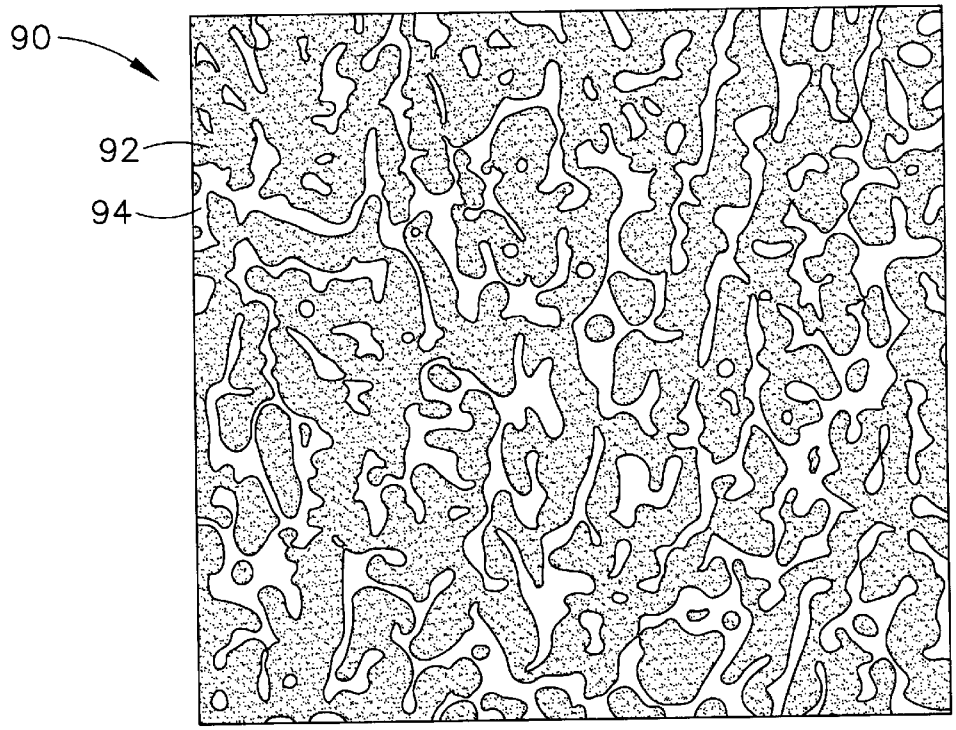
FIG. 5 is a schematic microstructure of the ceramic foam precursor material resulting from the contacting step.

The ceramic foam preform material 90 is shown in FIG. 5. This material is the precursor for the structures shown in FIGS. 2–3 and is similar in many ways. The open-cell solid foam material 90 comprises two interpenetrating, continuous regions 92 and 94. The region 92 is the ceramic that constitutes the cell walls and the region 94 is a metallic material. In the preferred case where the sacrificial ceramic is silica and the reactive metal is an aluminum-base metal, the region 92 is alumina (plus any modifiers that were added to the original sacrificial ceramic and remain). The intracellular region 94 is an aluminum-base metal that is also a reaction product but will, in general, have a different composition than that of the initial reactive metal. The region 92 is internally continuous within itself, and the intracellular region 94 is internally continuous within itself. All portions of either region are continuous, so that there is a continuous path from the external surfaces to any location within either phase. A consequence of this structure is that either the region 92 or the region 94, or both regions 92 and 94, may be modified to improve the bondability of the structure, numeral 70. The step 70, if performed, occurs after the contacting step 68 and before subsequent steps.

Two modification techniques are of particular interest in step 70. In one, all or part of the intracellular region 84 is replaced with another metal to improve the bondability and performance of the blade 24, numeral 74. Generally, the metal in the intracellular region may be replaced with a metal that is more suitable for particular applications. If the blade 24 is a turbine blade that must withstand elevated temperatures in service, it is desired that the intracellular volume 44 be filled with a nickel-base superalloy. The use of the nickel-base superalloy also enhances the bonding of the blade 24 to the disk 22. In the preferred case, where the intracellular region 94 is filled with an aluminum-base material after the contacting step and the blade 24 is a turbine blade, this initial intracellular metal is replaced with an intracellular nickel-base superalloy to form the intracellular volume 44 (and 54 if that volume is to be filled with metal).

To accomplish the replacement, the blade preform resulting from the contacting step 68 is contacted to a bath of the replacement liquid metal, such as nickel-base or copper-base alloys. The preform is maintained in the replacement liquid metal for a period of time, which depends upon the thickness of the composite material. This contacting allows diffusion to take place such that the aluminum is replaced by the liquid replacement metal from the bath. As an example, the aluminum/aluminum oxide composite material may be contacted to a nickel-base alloy for 8 hours at 1600° C. to effect the substantially complete replacement of the aluminum phase by the nickel-base alloy.

In a second modifying approach, numeral 72, the reaction-product metal may be removed from the intracellular region 94. The approach to removing the metallic phase in the intracellular region 94 will vary according to the composition of the metal. In the preferred case, all or part of the aluminum-base reaction-product metal may be chemically removed by dissolution in an appropriate chemical. For example, aluminum-base metals may be removed by reaction with HCl or NaOH.

The modification techniques 72 and 74 may be used to produce different structures in different parts of the blade 24.

For example, the aluminum-based reaction-product metal may be replaced in the root end 28 of the blade preform to produce the structure depicted in FIG. 2. The aluminum-based reaction product metal may also be replaced in the tip end 32 of the blade preform to produce the variant of the structure depicted in FIG. 3 in which the intracellular volume 54 is filled with a nickel-base superalloy. The aluminum-based reaction product metal may instead be removed to leave empty porosity in the tip end 32 of the blade preform to produce the variant of the structure depicted in FIG. 3 in which the intracellular volume 54 is empty porosity. The replacement of metal in the root end 28 and the removal of metal from the tip end 32 may be readily accomplished using masking techniques.

The surface of the blade 24 may optionally be sealed, numeral 75. The preferred sealing material is a ceramic sealing material of the same composition as the ceramic cell walls. In an example wherein the ceramic cell walls are alumina, the surface porosity may be coated with an alumina paste and then fired at a temperature of about 2800° F. for a time of about 8 hours. This produces a thin, smooth layer of ceramic at the surface, but the interior remains unchanged.

This completes the preparation of the blade or blades 24.

The disk 22 is provided, numeral 76. The disk 22 is fabricated by any operable technique. The fabrication of the disk 22 is known in the art, and does not form a part of the present invention.

The blades 24 are affixed to the disk 22 at the interface 30, numeral 78. The affixing may be accomplished by any operable technique that achieves a joint between the blades 24 and the disk 22. A metallurgical bond is preferred as the joint. The bond may be produced by resistance welding, in which an electrical current is applied through the blade 24 and the disk 22 to produce heating, melting, and interdiffusion at the interface 30. The bond may instead be produced by pressing the blade 24 and the disk 22 together and heating the assembly in a furnace to cause the metal of the blade 24 and the metal of the disk 22 to interdiffuse, either in the solid state or the liquid state. In a third approach, a brazing metal with a melting temperature lower than the metals of the blade 24 and the disk 22 may be placed into the interface 30 and melted and thereafter cooled, whereupon the blade 24 and disk 22 are bonded together.

An advantage of the present invention is that the size, shape, and/or dimensions of the turbine or compressor blade, as well as its precursor structures, may be adjusted as necessary at any of several steps in the process. For example, the fired material of step 66, which is silica in the preferred embodiment, may be reshaped or resized by glass shaping techniques or machining. After the contacting step 68, or the steps 70, 75, or 78, the turbine or compressor blade may be coarse machined and/or fine machined to adjust its size and dimensions, or to add detail features.

Figure 6:
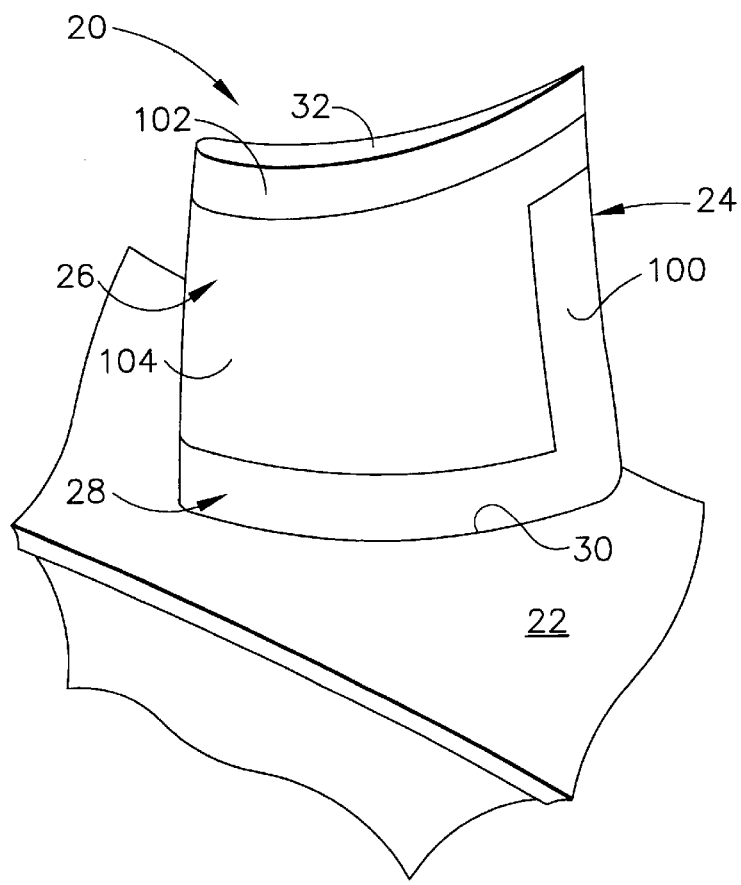
FIG. 6 is a fragmentary elevational view of a second embodiment of the gas turbine blisk.

The ceramic foam may constitute all or only a part of the blade 24, as shown in the embodiment of FIG. 6. FIG. 6 uses the same nomenclature and numbering as in FIG. 1 where appropriate, and the prior description is incorporated here. A first metallic nonfoam blade region 100 forms the root end 28 and a part of the trailing edge of the blade 24. A second metallic nonfoam blade region 102 forms the tip end 32 of the blade 24. The first metallic nonfoam blade region 100 and the second metallic nonfoam blade region 102 are not ceramic foams, and are preferably nickel-base superalloys. A ceramic foam region 104 forms the central part of the airfoil 26 of the blade 24 between the first metallic nonfoam blade region 100 and the second metallic nonfoam blade region 102. The metal and ceramic foam regions are joined by the same techniques discussed previously. Other combinations and arrangements are within the scope of the invention, as in a case where there is no second metallic nonfoam blade region 102 and the ceramic foam region 104 forms the central part of the blade 24 and the tip end 32 of the blade.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A blisk, comprising:
   a disk; and
   at least one blade integrally affixed to the disk, each blade including an airfoil comprising an open-cell solid ceramic foam comprising
   ceramic cell walls, and
   an intracellular volume therebetween.

2. The blisk of claim 1, wherein the disk comprises a disk nickel-base superalloy.

3. The blisk of claim 1, wherein at least a portion of the intracellular volume contains a blade metal and the disk comprises a disk metal, and wherein the blade metal and the disk metal are interdiffused at an interface between the blade and the disk.

4. The blisk of claim 1, wherein the cell walls comprise alumina.

5. The blisk of claim 1, wherein the cell walls comprise at least about 60 percent by volume of the ceramic foam.

6. The blisk of claim 1, wherein at least a portion of the intracellular volume is empty porosity.

7. The blisk of claim 1, wherein at least a portion of the intracellular volume is filled with a metal.

8. The blisk of claim 1, wherein at least a portion of the intracellular volume is filled with a blade nickel-base superalloy.

9. The blisk of claim 1, wherein the open cell solid ceramic foam comprises a portion of the blade, and wherein the remainder of the blade comprises a nonfoam metal.

10. The blisk of claim 1, further including
    a layer of a sealing ceramic at a surface of the ceramic foam.

11. A method for preparing a blisk comprising the steps of:
    providing a disk;
    providing at least one blade, each blade including an airfoil comprising an open-cell solid ceramic foam comprising
    ceramic cell walls, and
    an intracellular volume therebetween; and
    affixing each blade to the disk.

12. The method of claim 11, wherein the step of providing the disk includes the step of
    providing the disk comprising a disk nickel-base superalloy.

13. The method of claim 11, wherein the step of providing at least one blade includes the step of
    providing at least one blade wherein at least a portion of the intracellular volume is empty porosity.

14. The method of claim 11, wherein the step of providing at least one blade includes the step of
    providing at least one blade wherein at least a portion of the intracellular volume is filled with a metal.

15. The method of claim 11, wherein the step of providing at least one blade includes the step of
providing at least one blade wherein at least a portion of the intracellular volume is filled with a nickel-base superalloy.

16. The method of claim 11, wherein the step of providing at least one blade includes the steps of
providing a piece of a sacrificial ceramic having the shape of the blade, and
contacting the piece of the sacrificial ceramic to a reactive metal which reacts with the sacrificial ceramic to form an oxidized ceramic compound of the reactive metal and a reduced form of the ceramic, the resulting structure comprising the ceramic foam of the oxidized ceramic compound of the reactive metal with ceramic cell walls and the intracellular volume between the ceramic cell walls having a metallic reaction product therein.

17. The method of claim 16, including an additional step, after the step of contacting, of
removing at least a part of the metallic reaction product to leave porosity within the ceramic foam.

18. The method of claim 16, including an additional step, after the step of contacting, of
replacing at least a part of the metallic reaction product with a blade metal.

19. The method of claim 18, wherein the blade metal comprises a nickel-base superalloy.

20. The method of claim 11, wherein at least a portion of the intracellular volume contains a blade metal and the disk comprises a disk metal, and wherein the step of affixing includes the step of
interdiffusing the blade metal and the disk metal.

* * * * *